Dec. 22, 1953  T. S. SKILLMAN  2,663,398
ARTICLE VENDING SYSTEM
Filed Aug. 22, 1950  4 Sheets-Sheet 1

Inventor
Thomas S. Skillman
By Ward, Crosby & Neal
Attorneys

Patented Dec. 22, 1953

2,663,398

UNITED STATES PATENT OFFICE 2,663,398

ARTICLE VENDING SYSTEM

Thomas S. Skillman, Mosman, near Sydney, New South Wales, Australia, assignor to Punch Engineering Pty. Limited, Cammeray, near Sydney, New South Wales, Australia, a corporation of New South Wales Application August 22, 1950, Serial No. 180,723

Claims priority, application Australia October 14, 1946

14 Claims. (Cl. 194—10)

The invention relates to systems for vending and dispensing articles and more particularly to systems in which the dispensing of articles is related to the value in coins or tokens received by these systems.

This application is a continuation-in-part of my co-pending application Serial No. 778,194, filed October 6, 1947.

In earlier coin or token operated article dispensing systems the customer had to insert the correct amount in coins or tokens before he could collect each wanted article. A disadvantage of these systems lay in the fact that when the customer wanted to select a plurality of articles he had to select them one by one and pay each time.

A further system has been proposed which allows the customer to operate the mechanism for the selection of a plurality of articles prior to the tendering of coins. The selected articles are released to an intermediate position and are delivered to the customer after the insertion of the necessary coins to cover the value of the selected articles, which the customer has to work out himself. No means, however, are provided to give the customer an indication of the total value of his order, and the device marking this value at selection alters it as soon as coins are tendered, so that there is no means of checking the total value of articles originally marked by this device or the amount of money so far tendered. As the marking is done from manually operated selection levers, values are marked even for articles which are out of stock and will not be delivered, and there is no means for cancelling the delivery of articles once the selection levers have been operated.

The invention relates particularly to a system which comprises means to add up the prices or other values of the selected articles before they are delivered and a coin or token operated device to automatically permit the release of said selected articles when the value in coins or tokens received coincides with or exceeds the added up value of the selected articles. The coin or token operated device is adapted to accept for this purpose a plurality of coins or tokens of various values.

According to another feature of the invention the value of a selected article is added only after the release of such article from storage has been detected, or after a signal confirming that it is available for release, thus ensuring that the customer is not charged for an article which has been selected, but for any reason not released from storage.

According to a further feature of the invention announcing means are provided to announce to an operator or customer the progressive total of the added up values, so that the operator or customer while making his selection is always aware of the amount so far inserted. This total remains visible until such time as the goods are actually delivered to the customer.

According to another feature of the invention the total of the added up prices is paid to a cash register which then automatically releases the articles.

According to still another feature of the invention the articles selected from the various shelves are conveyed to a conveyor belt and stored there until payment has been made. When the appropriate amount has been paid, either by inserting coins or through the cash register, this conveyor belt is automatically started and releases the articles to the customer.

Still a further feature of the invention consists in an arrangement which returns the selected articles to a collecting bin when the customer presses a "cancel" key or when the payment made does not coincide with the amount added up by said adding means.

According to a still further feature of the invention a customer's selections are stored until coins or tokens to the required value are inserted, when all articles selected are released together.

These and other features of the invention will be more clearly understood from the following description in connection with the drawings in which—

Figure 1:
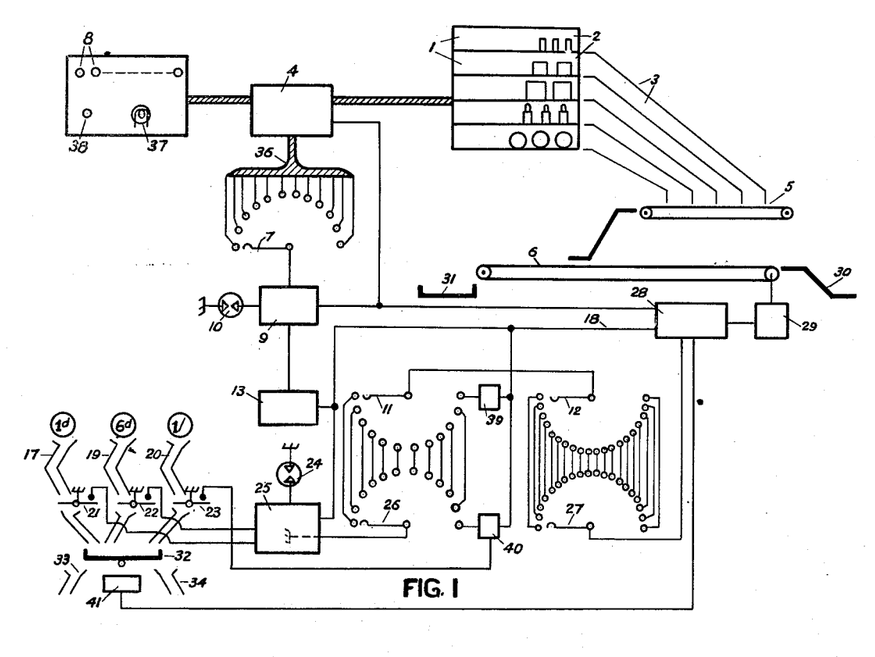
Fig. 1 shows schematically one embodiment of the invention.

In Fig. 1 a series of storage shelves 1 are filled with articles 2 which may be released automatically.

The customer or the shop assistant selects the wanted articles by operating a series of push buttons 8 which are electrically connected with the control equipment 4. This control equipment releases the selected articles 2 from the appropriate shelves 1 and then the articles are conveyed through chutes 3 to a common conveyor belt 5 which transports them to a belt 6 which is normally stationary.

While selecting the articles the control equipment 4 marks via cable 36 a particular terminal on a pricing switch 7, or this terminal may be marked by contacts operated by selected articles on release. The equipment 4 includes a jumpering frame whereby the terminal marked by the release of any particular line of articles can readily be related to the price of the respective articles and can easily be changed whenever necessary.

Figure 6:
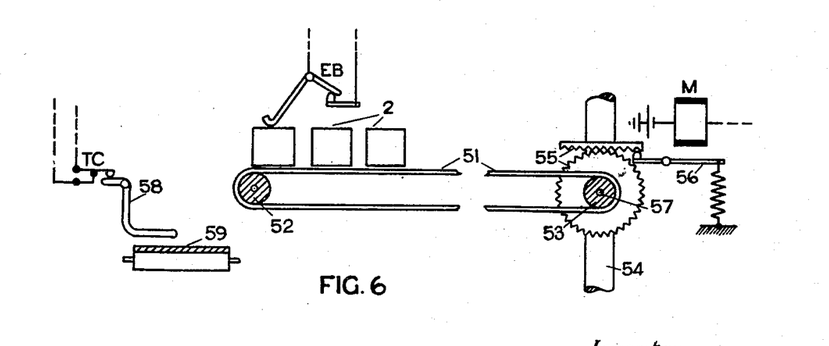
Fig. 6 shows a storage shelf and release mechanism which may be used in connection with the invention.

Fig. 6 shows one type of storage shelf and release mechanism which may be used. The articles 2 are stored on an endless belt 51, which passes around normally stationary rollers 52 and 53. The roller 53 is fixed to a shaft 57, which may be coupled by means of a clutch 55 to a constantly running shaft 54. The clutch 55 is engaged by an extension of the armature 56 of magnet M, which is selectively energised from buttons 8 on the selection of the kind of article carried. The engagement of clutch 55 causes roller 53 to drive the belt 51 forward until one of the articles 2 topples off over the roller 52. The article so released from the bin hits the arm 58 which operates the trip contact TC to release the magnet M, thus preventing the delivery of further articles, and also, if desired, to mark the terminal of the pricing frame related to the kind of article released. The released article is carried by conveyor belt 59, which may be common to a plurality of storage belts 51, to the appropriate chute 3 (Fig. 1) and thence to the delivery position in the manner already described.

Returning now to Fig. 1, a control gear 9 is associated with the pricing switch 7 and causes this switch to hunt for the marked terminal. When this terminal is found the pricing switch 7 is stepped back to its normal position by means of a continuously running interrupter 10. Details of the circuit and its operation are described later on in connection with Fig. 4.

When the pricing switch 7 is stepped up to find the marked terminal a switch 11 is stepped up also. The switch 11 forms part of an adding unit consisting of the two switches 11 and 12 and a control relay group 13. When the pricing switch 7 moves back to its initial position, switch 11 remains on the last position thus indicating the total of the added up prices of all the articles selected so far.

To make the price control independent of the customer's operation of the push buttons, electrical storage groups marked by this operation can be provided inside the control equipment 4. An example of such storage groups is described later on in connection with Fig. 5.

The storage groups can be made large enough to carry a record of all items required by the customer, so that no release of articles occurs until the money has been put in. In this case the belt 6 may be running continuously. This feature is described in greater detail in connection with Fig. 5. Also by this means facilities for a "cancel" key may be provided, whereby the last item selected by the customer can be cancelled (in this latter case, the counting switches 11 and 12 would be two directional and stepped back upon cancellation, or alternatively, two groups of switches such as 11 and 12 could be provided, one for indicating and the other to take the final total when the storage is complete).

When the adding system is to be used for £ s. d. indication switch 11 is provided with 12 steps and switch 12 with 20 steps representing pence and shillings. A corresponding arrangement, for example using 5 cents as a base, can be made in case of a dollar indicating machine. If used for pence and shillings indication one revolution of switch 11 causes switch 12 via switching mechanism 39 to make one step forward. Both switches can be connected with price announcing means. For example indicating lamps 14 and 15 (Fig. 2) located in two rows in front of the customer can be used for this purpose. These two rows of lamps indicate progressively in shillings and pence the total of the added up prices of the selected articles.

When the customer has selected all the articles which he requires he inserts coins or other tokens in the coin collecting mechanism 16 (Fig. 2) for an amount shown at the indication lamps 14 and 15.

In the drawing the coin collecting mechanism 16 is shown in more detail at the left corner of Fig. 1. Three slots 17, 19 and 20 are used for the insertion of coins of various denominations. The coin slots which are of the usual pattern have contacts 21, 22 and 23 operated by inserted coins and connected with the control mechanism 25 and its impulsing interrupter 24. The control mechanism 25 controls a step-by-step switch 26 for inserted penny coins. A second step-by-step switch 27 is operated by switching mechanism 40 whenever switch 26 reaches its twelfth step or when shilling coins are inserted in slot 20. The banks of switches 26 and 27 are so interconnected with the banks of switches 11 and 12 that a circuit is closed when the two sets of switches are in the same position or when the switches 26 and 27 pass the position held by switches 11 and 12 to cover the case where the customer puts in more money than is actually called for.

When the customer inserts a penny in the appropriate slot, the control mechanism 25 is operated via the contact 21 to step switch 26 forward for one step. In case 6 d. is inserted control mechanism 25 steps switch 26 forward for six steps under the influence of contact 22. In a similar way switch 27 is stepped up one step when 1/- is inserted in slot 20 to operate contact 23. When switch 26 has made a complete revolution of 12 steps it causes switch 27 controlling the shilling amounts to step one step forward.

When the position of switches 26 and 27 coincides with the position of switches 11 and 12 the circuit is closed which causes the operation of a further control group 28 and thus starts the motor 29 which drives the belt 6. The articles selected before and stored on belt 6 are thus carried to the chute 30 and delivered to the customer.

After a predetermined time period, the control unit 28 stops the motor 29 and thus belt 6 and furthermore restores via lead 18 the adding switches 11 and 12 and the coin-operated control switches 26 and 27 to normal. If the customer does not insert the money or if he operates the "cancel" key 38 the control unit 28 causes the belt 6 to run in the reverse direction after a predetermined time has elapsed and thus the articles selected on belt 6 are carried to a hopper 31 from which they can be later collected and restored to the various shelves to which they belong.

The money (coins or other tokens) which has been inserted in the slots 17, 19 and 20 is collected in a tray 32 and when the whole transaction is completed the control mechanism 28 influences tray 32 by operation of a suitable device 41 to tip the tray over so that the money is collected in a receptacle marked by the slot 33. In cases where the customer has not inserted the correct money or has operated the "cancel" key, or whenever the mechanism 28 operates to reverse the travelling direction of belt 6, the device 41 is operated in such a way that the tray is tipped in the opposite direction. The money then falls into a chute 34 and will be returned to the customer.

Figure 2:
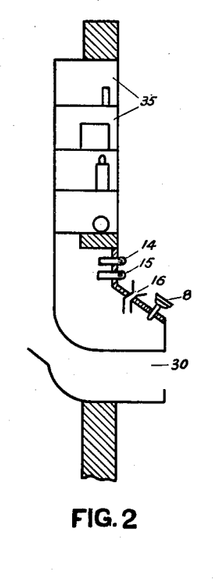
Fig. 2 shows a cross section of an arrangement to be used for a system as shown in Fig. 1.

To facilitate the selection the articles on sale can be displayed in show cases 35 as shown in Fig. 2. Push buttons can be arranged at each small show window showing a specific article, so that the customer has only to press the button associated with the particular articles he requires. Many modifications of this arrangement are possible without departing from the spirit of the invention. The buttons, for example, may be arranged in a special group as shown for buttons 8 and the name of each article may be printed near each button. Alternatively, it is possible to mark the various articles with special code numbers so that these numbers can be keyed up by the customer by means of a 10 digit or 20 digit key set.

Instead of the coin-operated mechanism a cash register can be used for the same purpose. When the customer tenders the appropriate amount this amount is keyed up on the cash register and the cash register then operates the control mechanism 25 and the switching mechanism 40 in the same way as described above.

Other changes in the arrangement described above for adding up and announcing the total of the added up prices of the selected articles and for co-relating this amount against the money received into the equipment can be used without departing from the scope of the invention.

Figures 3, 7:
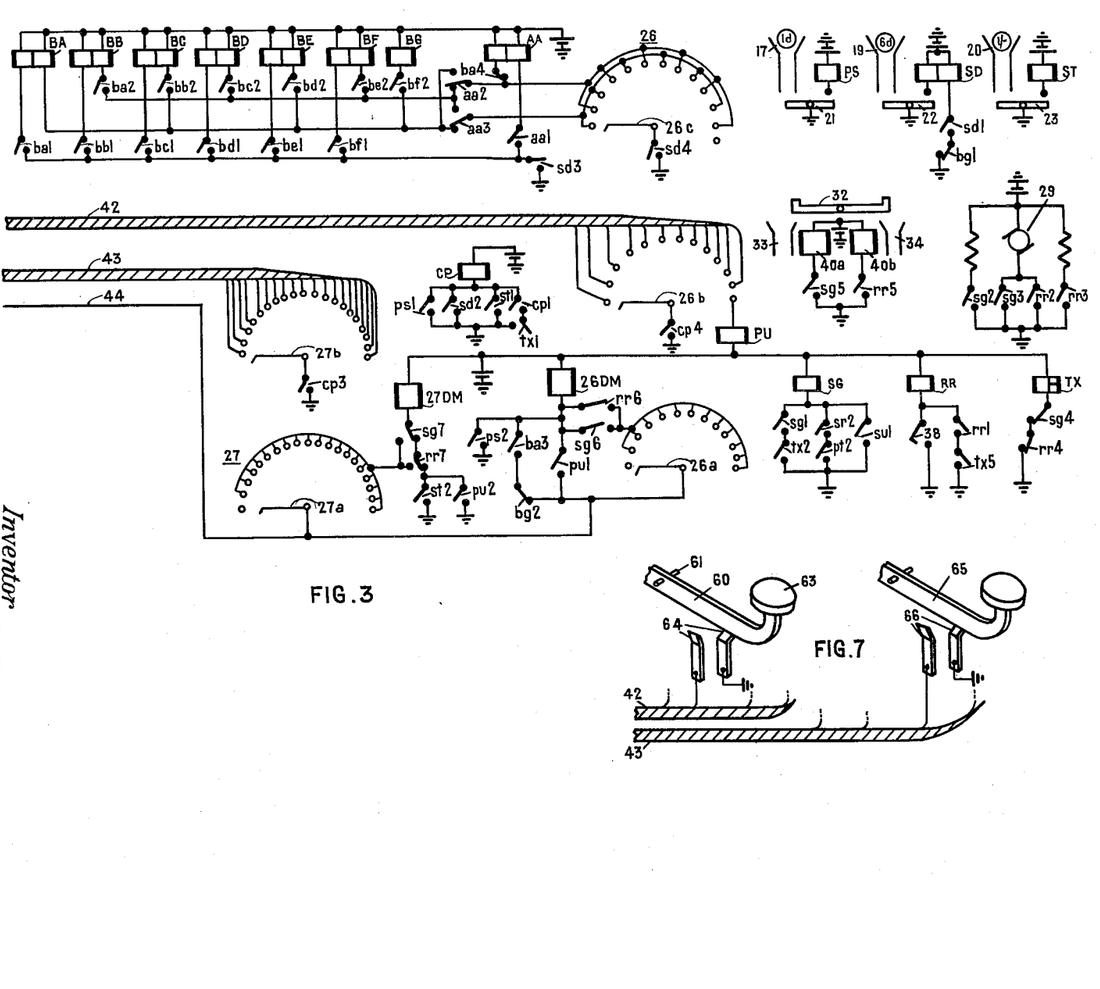
Figs. 3, 4 and 5 show further electrical details of the invention.
Fig. 7 shows the operation of electrical contacts by cash register keys.
Figure 4:
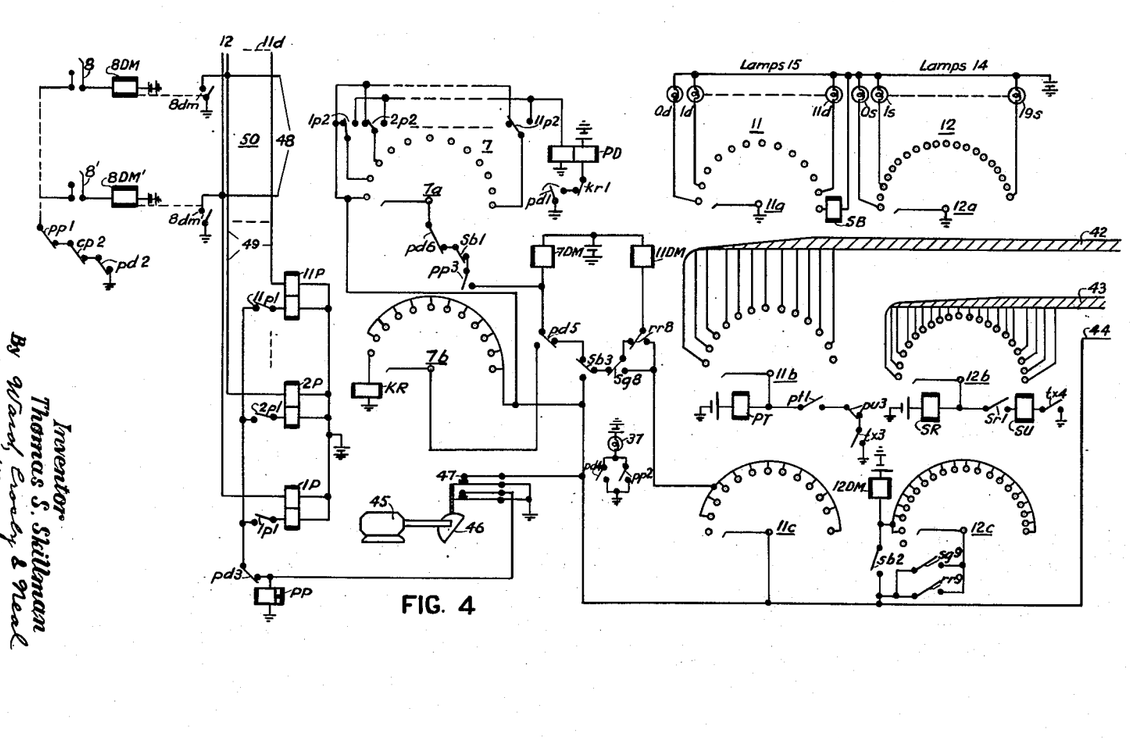

A more detailed description of the electrical circuits involved in Fig. 1 is given hereunder and shown in schematic form in Figs. 3 and 4. In the circuit diagrams the "detached contact" method is used, the relay contacts being shown where they are used in the circuit, and not necessarily next to the corresponding relays. The relays are marked with capital letters, and their contacts are each indicated by a corresponding small letter followed by the number of the contact.

In Fig. 4 a plurality of keys 8 . . . 8' are shown, which are individually connected with corresponding magnets 8DM . . . 8DM'. These magnets operate the release mechanisms of the various kinds of articles stored in the storage devices and at the same time close their contacts 8dm . . . 8dm'. In a preferred arrangement these contacts, however, are operated by the released articles and thus correspond to contact TC (Fig. 6).

If, for example, key 8 is pressed by a customer, it operates the magnet 8DM from battery over magnet 8DM, key 8, contacts pp1, cp2, pd2 to earth. Magnet 8DM releases the corresponding article which operates contact 8dm.

The contact 8dm applies earth to a horizontal bar 48 in a jumpering frame 50. This bar is connected to a particular vertical bar 49 representing the price to be charged for the article.

Assuming that the article released by key 8 is priced at twopence; relay 2P now operates over the circuit through the vertical bar 49, the horizontal bar 48 corresponding to the article concerned, through operated contact 8dm to earth.

Operated contact 2p1 locks relay 2P to contact pd3 and through relay PP or contacts 47 to earth.

Operated contact 2p2 prepares a circuit for relay PD.

Contacts 47 are opened and closed continuously by a cam 46 driven by the motor 45. As a set of these contacts short-circuits relay PP this relay will not operate until the contacts 47 are open. Relay PP is slow to release, however, and will then remain operated during further periods when it is short-circuited. Operated contact pp1 breaks the circuit to the keys 8 to 8', preventing any further articles being selected for the time being. Operated contact pp2 lights a lamp 37 indicating to the customer that he should wait until the price is recorded. Operated contact pp3 prepares a circuit for the driving magnets of the pence counting switch 7 and the pence adding switch 11, each of which is a reverse-drive switch which has several banks of contacts 7a, 7b, and 11a, 11b and 11c respectively.

These driving magnets 7DM and 11DM are normally connected in parallel over contacts rr8, sg8, sb3, pd5, and are now prepared to operate together over operated contact pp3, contacts sb1, pd6, 7a wiper and first bank contact, through the contacts 47 to earth.

As relay PP can operate only when these contacts are open, there is at first no circuit for magnets 7DM and 11DM, but these operate as soon as the contacts 47 close again. When these contacts re-open, the magnets release and cause the switches to step on one position.

The circuit is now completed through contact 2 of bank 7a, contact 1p2 to contacts 47. This causes the switches to be stepped on again by the next make and break of contacts 47. In this position the circuit extends from wiper and contact bank 7a through contact 2p2, which is operated, through relay PD to earth. Relay PD operates but magnets 7DM and 11DM will not operate in series with this relay.

Thus the switches 7 and 11 have been stepped on two contacts, representing the twopence price of the article delivered. The contact bank 11a is connected with lamps 15 to indicate the amounts from 0 d. to 11 d. Thus the lamp 15 corresponding to 2 d. lights from switch bank 11a to indicate that twopence have been recorded.

Operated contact pd1 locks relay PD via contact kr1. Operated contact pd2 holds the earth off keys 8 to 8'. Operated contact pd3 releases relays 2P and PP. Operated contact pd4 keeps lamp 37 alight after PP releases. Operated contact pd5 breaks the circuit between magnets 7DM and 11DM and connects magnet 7DM through 7b wiper and bank to the contact 47. Operated contact pd6 breaks the circuit between magnet 7DM and bank 7a. Thus the magnet 7DM operates under the control of contacts 47 and rotates switch 7 until it reaches its normal position in which relay KR operates in series with magnet 7DM, which will not operate in this condition. Operated contact kr1 permits relay PD to release, permitting lamp 37 to be extinguished and returning earth to the keys 8 to 8' ready for the selection of the next item. At contact pd5 the circuit for relay KR is interrupted. Thus, switch 7 has returned to normal ready to count the next price, while switch 11 remains on the position representing the number of pence already counted. When, during the rotation of the switches 7 and 11, the switch 11 reaches the twelfth pence position, relay SB operates over bank and wiper 11a to earth. Operated contact sb1 breaks the stepping circuit for magnet 7DM and 11DM. Operated contact sb2 closes a circuit for the driving magnet 12DM of the shillings adding switch 12 through contacts 47 to earth. Operated contact sb3 closes a circuit for magnet 11DM through contacts rr3, sg3, sb3 operated, to contacts 47 and earth.

When contacts 47 close and re-open these switches both make one step. Switch 12 counts one shilling which is indicated on lamps 14 through wiper and bank 12a; switch 11 moves onto 0 pence, releasing relay SB and permitting magnets 7DM and 11DM to step on again as before.

As each article is selected on keys 8 to 8' and delivered by magnets 8DM to 8DM', switch 7 in conjunction with relays 1P to 11P and their contacts 1P1 to 11P1 and 1P2 to 11P2 counts the price, while switches 11 and 12 accumulate the total of the various prices.

When the customer has selected all the articles he desires he must pay the total price indicated on the lamps 14 and 15 in order to cause the motor 29 (Fig. 1) to drive the belt 6 and deliver the goods through the chute 30. The customer therefore inserts coins through slots corresponding to the denominations thereof (17, 19 or 20 in Fig. 1), which strike contacts 21, 22 or 23 and operate relays PS, SD, or ST respectively. Operation of any of these relays causes relay CP to operate over operated contact ps1, sd2 or st1, and lock over operated contact cp1 to operated contact tx1. (Relay TX is normally operated over contacts rr4 and sg4.) Operated contact cp2 (Fig. 4) removes earth from keys 8 to 8', so that no more goods can be obtained once the customer has started to insert coins. Operated contacts cp3 (Fig. 3) and cp4 apply earth to the price-checking circuits of switches 26 and 27 (to be described later). These switches are each provided with several contact banks and can also be used for a visual indication of the amounts tendered by a customer.

When for example a penny is inserted through slot 17, contact 21 operates relay PS. Operated contact ps1 operates relay CP. Operated contact ps2 closes a circuit for 26DM, the driving magnet of the pennies checking switch 26; when the coin falls into the receptacle 32 relays PS and magnet 26DM release, causing the switch to step on one contact. Similarly, a shilling operates contact 23 and relay ST, and steps on the shillings checking switch 27 by a circuit for magnet 27DM over contacts sg1, rr1, and st2 in the operated position.

When a sixpence is inserted in slot 19 it is necessary to cause the pennies checking switch 26 to step on six times. To accomplish this relays BA to BG are brought into operation as follows:

The coin from slot 19 causes contact 22 to operate relay SD which locks over operated contact sd1 to contact bg1 and earth. Operated contact sd2 operates relay CP. Operated contact sd3 prepares a locking circuit for relays AA and BA to BG. Operated contact sd4 applies earth to a wiper 26c of the pennies checking switch. According to the position of this wiper on the bank this causes either relay BA or AA to operate. If relay BA operates operated contact ba4 prevents relay AA from operating later. If relay AA operates it locks over operated contact aa1 to operated contact sd3. Operated contacts aa2 and aa3 reverse the leads from bank 26c to relays BA to BG, causing relay BA to operate. Operated contact ba4 now has no effect on relay AA, which remains operated. Operated contact ba1 locks relay BA to operated contact sd3. Operated contact ba2 prepares a circuit for relay BB. Operated contact ba3 connects magnet 26DM through contact bg2 and lead 44 to contacts 47 (Fig. 4). This circuit causes switch 26 to be driven round under the control of contacts 47. When switch 26 (Fig. 3) has made one step a circuit will be closed for relay BB over operated contact ba2, and contact aa2 or operated contact aa3, 26c bank and wiper, operated contact sd4, to earth. Similarly on successive steps relays BC, BD, BE and BF with their contacts bc1, bc2; bd1, bd2; be1, be2; bf1, bf2 respectively will be operated, each locking to operated contact sd3.

After the sixth step relay BG operates, unlocking relay SD at operated contact bg1 and breaking the circuit of magnet 26DM at operated contact bg2. Relay SD releases and unlocks relays AA and BA to BG so that all these relays release.

When the pennies checking switch 26 reaches the twelfth penny position relay PU operates over operated contact cp4 and wiper 26b. Operated contact pu1 causes magnet 26DM to step this switch onto the 0 pence position under the influence of contacts 47 (Fig. 4), at the same time releasing relay PU (Fig. 3). The operation and release of relay PU causes over contact pu2 the magnet 27DM to step the shillings checking switch 27 forward one step to indicate one shilling. At the same contact pu3 (Fig. 4) interrupts temporarily a circuit for relay PT as described later.

When the number of pence received equals the number recorded on the pricing switch 11, a circuit is closed for relay PT over wiper and bank 11b, one wire of cable 42, bank and wiper 26b (Fig. 3) to earth through operated contact cp4. Relay PT (Fig. 4) locks over operated contact pt1 to contact pu3, operated contact tx3 to earth. Contact pu3 causes relay PT to release every time a shilling is carried over from switch 26 to the shilling checking switch 27. Operated contact pt2 (Fig. 3) prepares a circuit for relay SG.

When the correct number of shillings has been deposited relay SR (Fig. 4) operates over wiper and bank 12b, one wire of cable 43 (Fig. 3), bank and wiper 27b in the corresponding position, and operated contact cp3 to earth. Operated contact sr1 (Fig. 4) prepares a circuit for relay SU which is short-circuited to earth through wiper 12b and does not operate yet. Operated contact sr2 (Fig. 3) prepares a circuit for relay SG.

Relay SG operates over operated contacts sr2 and pt2 when both relays SR and PT have operated. If instead of a required penny amount an extra shilling should be inserted, switch 27 will step on one contact and remove at wiper 27b the short-circuit across relay SU (Fig. 4) which now operates in series with relay SR over the normally operated contact tx4.

Operated contact su1 (Fig. 3) operates relay SG irrespective of whether relay PT is operated or not. Relay SG locks to operated contact tx2 over its own contact sg1. Operated contacts sg2 and sg3 close circuits for the motor 29 to run in the forward direction and thus to deliver the articles as described before. Operated contact sg4 breaks the circuit for relay TX which has a release delay period sufficiently long to permit the goods to be delivered before it releases.

Operated contact sg5 causes the magnet 40a to tilt the tray 32 to drop the coins into receptacle 33. Operated contacts sg6 and sg7 (Fig. 3) and sg8 and sg9 (Fig. 4), close circuits which return the various rotary switches to their normal positions. When relay TX (Fig. 3) releases, the contacts tx1, tx2 and tx5 (Fig. 3) and tx3 and tx4 (Fig. 4) break the various relay locking circuits, restoring all relays to normal, and relay TX is energised again.

Should the customer press the cancel key 38 (Fig. 3) before taking delivery of the selected articles, relay RR is operated and locks over contact rr1 to operated contact tx5. Operated contacts rr2 and rr3 cause the motor to run in the reverse direction and deliver the goods back to a hopper (31 in Fig. 1). Operated contact rr5 causes the magnet 40b to tilt the tray 32 so as to return the money to the customer through the slot 34. Operated contact rr4 releases relay TX. Operated contacts rr6 and rr7 (Fig. 3) and rr8 and rr9 (Fig. 4) cause the rotary switches to return to normal.

As mentioned before, electrical storage groups may be provided to record the selections of all articles required by the customer, so that no release of articles occurs until the correct amount of money has been tendered. If this arrangement is adopted, there is no need for belt 6 to be reversible, and this belt may either run continuously in the forward or delivery direction, or be normally stationary and adapted to run in the forward direction when articles are to be delivered.

Figure 5:
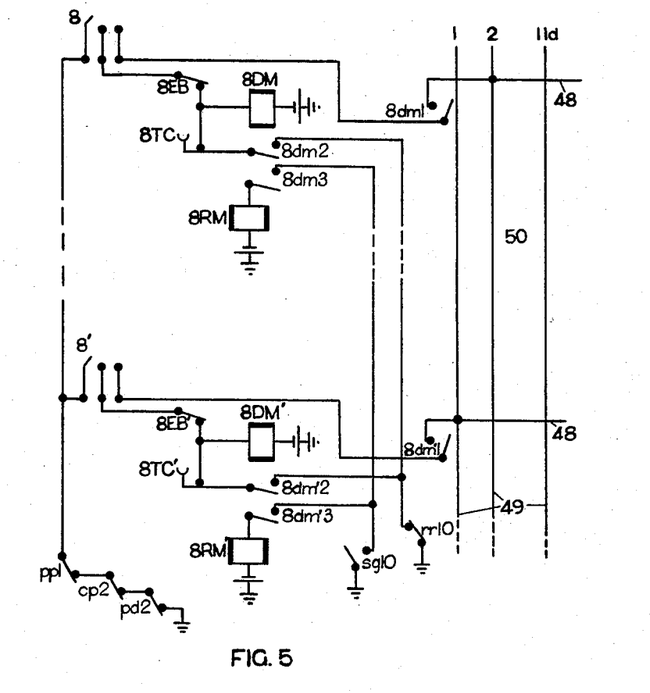

Fig. 5 illustrates a circuit arrangement which may be used in this connection and which replaces the selecting apparatus and the pricing frame 50 of Fig. 4. Since no article is released until all required by a customer have been selected and paid for, the operation of the price adding mechanism cannot be made dependent on article operated contacts. The keys 8 . . . 8' are therefore provided with two contacts each, one to operate the selecting and the other to operate the price adding mechanism. A "bin empty" contact EB (see also Fig. 6) is provided for each storage shelf, which is closed when there is an article at the end thereof available for delivery, but open when no article is available. The circuit is so arranged that when the EB contact of a selected storage shelf is open, no recording is made of the selection and the price is not added.

The operation of the circuit proceeds as follows. The operation of one of the keys 8 . . . 8' closes a circuit from earth over normally closed contacts pd2, cp2 and pp1, the first contact of the pressed key 8 (supposing this to be the key operated) and closed contact EB (if an article is available) through relay 8DM to battery, thus energising relay 8DM.

Relay 8DM closes its contacts 8dm1, 8dm2 and 8dm3. Contact 8dm1 puts earth over contacts pd2, cp2 and pp1, the second contact of key 8 and contact 8dm1 on the twopence price bar 49, thus operating relay 2P (Fig. 4), and adding the price of the selected article as described before in connection with Figs. 3 and 4.

Contact 8dm2 closes a holding circuit for relay 8DM from earth over contacts rr10, 8dm2 and 8TC, which is the article operated contact TC (Fig. 6) for the selected storage shelf, and relay 8DM to battery.

When key 8 is now released relay 8DM is held operated, and the price of the selected article has been marked on the price adding mechanism and the earth marking it removed, to allow further prices to be marked and added.

Contact 8dm3 prepares a circuit over contact sg10 for magnet 8RM, which is the release magnet 8RM, which is the release magnet (M in Fig. 6) for the selected storage shelf. However as contact sg10 is still open, magnet 8RM is not yet energised to effect the release of an article.

Similarly, circuits may be prepared for any of the magnets 8RM . . . 8RM' associated with articles required by a customer, and the prices of the articles selected will be progressively added. When a customer has selected all the articles he requires, he inserts coins to the value of these articles, whereupon relay SG (Fig. 3) is energised as described before and closes its contact sg10 to energise the magnets 8RM . . . 8RM' which have been previously selected. An article is released from each of the selected storage belts, and on release operates the associated contact TC to break the holding circuit for the corresponding relay 8DM. The selected relays 8DM . . . 8DM' are thus released and the selection circuits restored to normal.

Relay SG also performs the other operations, including the starting of motor 29 as described before. As articles are only released from storage when the proper amount has been tendered the motor 29 (Fig. 3) need not be reversible and thus could run continuously in the forward direction. The contacts sg2 and sg3 could therefore be replaced by permanent connections.

If the customer presses the cancel key 38 (Fig. 3) before the full price has been inserted, relay RR (Fig. 3) is operated as described before, to return the money so far paid and to break (over contact rr10 in Fig. 5) the holding circuits for the selected relays 8DM . . . 8DM'. Since no reversible motor circuit is required, as mentioned above, the contacts rr2 and rr3 of relay RR and the corresponding field winding of motor 29 are not required.

In Figs. 4 and 5, price bars from one to eleven pence only have been shown. These are sufficient provided no article is to be priced at more than elevenpence, but if articles of greater value are to be handled it is necessary to provide additional price bars for shilling values. Separate 8dm contacts are then used to mark the price in shillings and pence of a selected article. The counting of shillings is effected by a switch operated in the same way as switch 7, the amounts counted being transferred to and added by switch 12 just as the amounts counted by switch 7 are transferred to and added by switch 11. The circuit shown in Fig. 4 for transferring to switch 12 a shilling, added in twelve penny steps by switch 11, is retained, so that switch 12 is adapted to add shillings transferred either from the additional shilling counting switch, or from switch 11.

An alternative to the use of individual selecting keys is to use a selecting device comprising a keyboard bearing only a small number of keys; such keys are then used in combination to select any item, relay or switch contacts operated indirectly by the keys of the selecting device replacing the contacts otherwise directly operated thereby. A keying arrangement of this kind is, for example, shown in my United States Patent No. 2,535,461, issued December 26, 1950, the magnets M being equivalent to the magnets 8DM, 8DM' in Fig. 4.

Where it is desired to have the money paid to a cashier instead of placed in slots, the keys of a cash register may be fitted with contacts which replace the switch banks 26b and 27b, so completing circuits through relays SR and PT to release the goods when the correct amount has been set up on the cash register keys. Switches 26 and 27 and their associated relays may then be deleted entirely. Such an arrangement is illustrated in Fig. 7. Two keys only are shown, which represent the penny keys and shilling keys respectively of a cash register. It must, of course, be understood that one key has to be provided for each value in each denomination. The penny key 60 is pivoted in the usual manner at pivot 61 and when depressed by knob 63 connects the two contact springs 64 thus connecting earth with a corresponding wire in cable 42 leading to switch 11b (Fig. 4) and performing the same function as switch 26b. Similarly the shilling keys are connected with corresponding leads in cable 43 as indicated in Fig. 7 by the key 65 and the associated contact springs 66.

Although in the embodiment described above a reversible belt is used to deliver the articles to the customer or to return them to the store, other conveying means can be used instead to change the direction of delivery. Similarly, although storage belts have been spoken of, other storage devices can equally well be used.

In the example provision is made for the use of three different coins (one penny, sixpence and one shilling) but the vending system can be adapted to other coins or similar tokens without departing from the spirit of the invention. It should be clearly understood, too, that the invention is not only suited for coin operation, but also for operation by tokens representing either money or other values (for example, rationing points) other than money.

I claim:

1. A system for vending articles of varied character, comprising: means to dispense selected articles; automatically operated adding means settable to positions corresponding to the totalized values of selected articles; a coin operated device adapted to accept a plurality of coins of various monetary units and including counting means settable independently from said adding means to positions corresponding to the totalized values of coins received; electrical circuits connecting said adding means and said counting means and including means connected with said dispensing means and operable over said electrical circuits in corresponding positions of said adding means and said counting means to permit the delivery of selected articles when the amount in coins received by said coin operated device is at least equal to the added up cost of said selected articles.

2. A system for vending articles of varied character, comprising: a plurality of storage devices, each including electrically operated releasing means for dispensing selected articles from said storage devices; switching means for selectively actuating any said releasing means; adding means settable to positions corresponding to the totalized values of selected articles; contact means associated with said releasing means and operable by selected articles on their release from said storage devices; electrical connections from said contact means to said adding means to actuate said adding means; a coin operated device adapted to accept a plurality of coins of various monetary units and including counting means settable independently from said adding means to positions corresponding to the totalized values of coins received; electrical circuits connecting said adding means and said counting means and including means connected with said dispensing means and operable over said electrical circuits in corresponding positions of said adding means and said counting means to permit the delivery of selected articles when the amount in coins received by said coin operated device is at least equal to the added up cost of said selected articles.

3. A system for vending articles of varied character, comprising: a plurality of storage devices, each including electrically operated releasing means for dispensing stored articles from said storage devices; switching means for selectively actuating any said releasing means; adding means and connections therefrom to said switching means for actuating said adding means in response to actuation of said switching means to totalize the values of a plurality of articles selected thereby; a coin receiving device to receive coins of various monetary units, said coin receiving device including counting means to totalize the values of coins received by said device; electrical connections between corresponding positions of said adding means and said counting means; relay means to detect the coincidence in values totalized by said adding means and by said coin receiving device respectively and connections therefrom to said adding means and to said counting means including said electrical connections between said adding and said counting means; and conveying means and connections therefrom to said relay means and operable thereby to transfer released articles to a common delivery point.

4. A system for vending articles of varied character, comprising: a plurality of storage devices, each including electrically operated releasing means for dispensing selected articles from said storage devices; switching means for selectively actuating any said releasing means; contact means associated with said releasing means and operable by selected articles on release from said storage devices; adding means and electrical connections therefrom to said contact means to totalize the values of a plurality of selected articles; a coin receiving device to receive coins of various monetary units, said coin receiving device including counting means to totalize the values of coins received by said device; electrical connections between corresponding positions of said adding means and said counting means; relay means to detect the coincidence in values totalized by said adding means and by said coin receiving device respectively and connections therefrom to said adding means and to said counting means including said electrical connections between said adding and said counting means; and conveying means and connections therefrom to said relay means and operable thereby to transfer released articles to a common delivery point.

5. A system for vending articles of varied character, comprising: a plurality of storage devices, each including electrically operated releasing means for dispensing selected articles from said storage devices; selecting switching means operable to select any of said storage devices; electrical storage groups and connections therefrom to said switching means and said releasing means, said storage groups being operable by said switching means to store indications representing selected storage devices; automatically operated adding means operable by said switching means to totalize the values of selected articles; a coin receiving device to receive coins of various monetary units, said coin receiving device including counting means to totalize the values of coins received by said device; and relay means, and connections therefrom to said adding means, said counting means and said storage groups, to actuate the releasing means of said selected storage devices when the amount in coins received by said coin operated device is at least equal to the totalized cost of said selected articles.

6. A system for vending articles of varied character, comprising: a plurality of storage devices, each including electrically operated releasing means for dispensing selected articles from said storage devices; switching means operable to select any of said releasing means for actuation; adding means, including stepping selector switches responsive to the selection of said articles, to totalize the values of said selected articles; a coin receiving device to receive coins of various monetary units, said coin receiving device having counting means, including stepping selector switches to totalize the values of coins received by said coin receiving device; indicating means and connections therefrom to the stepping selector switches of said adding means and to the stepping selector switches of said counting means to indicate the totalized values of said selected articles and said received coins respectively; and means to effect the delivery of said selected articles when the totalized values of said received coins are at least equal to the totalized values of said selected articles.

7. A system for vending articles of varied character comprising: a plurality of storage devices, each including electrically operated releasing means for dispensing selected articles from said storage devices; switching means for selectively actuating any said releasing means; adding means and connections therefrom to each of said releasing means, for actuating said adding means in response to actuation of any said releasing means to totalize the values of articles dispensed thereby; a coin receiving device including coin-operated contact means operable by coins of various monetary units, counting means to totalize the values of coins received by said coin receiving device, and connections from said counting means to said contact means; electrical connections between corresponding positions of said adding means and said counting means; relay means to detect the coincidence in values totalized by said adding means and by said counting means respectively and connections from said relay means to said adding means and to said counting means including said electrical connections between said adding and said counting means; and power operated conveyor means including driving means and connections therefrom to said relay means and operable thereby to deliver released articles to a common delivery point.

8. A system according to claim 7 wherein said relay means include a timing device to stop said driving means after operation within a predetermined time period.

9. A system for vending articles of varied character, comprising: a plurality of storage devices, each including electrically operated releasing means for dispensing selected articles from said storage devices; switching means for selectively actuating any said releasing means; adding means to add up progressively the values of a plurality of selected articles; a cash register including contact means operable in accordance with the amount in value received; relay means to detect the coincidence in values added up by said adding means and received by said cash register respectively and connections therefrom to said adding means and to said cash register; and conveying means and connections therefrom to said relay means and operable thereby to transfer released articles to a common delivery point.

10. A system according to claim 9 wherein said adding means includes stepping selector switching means and indicating means and connections therefrom to said stepping selector switching means to indicate progressively the added up values of selected articles.

11. A system for vending articles of varied character, comprising: a plurality of storage devices, each including electrically operated releasing means for dispensing selected articles from said storage devices; switching means operable to select any of said storage devices; a coin operated device adapted to accept a plurality of coins of various denominations; an article delivery position and an article return position; retaining means arranged between said article delivery position and said article return position to hold selected articles in an intermediate position; and further means, controlled from said coin operated device, to transfer said articles to the article delivery position and the article return position respectively depending on the amount of money received by said coin operated device in relation to the total value of the articles held in said intermediate position.

12. A system for vending articles of varied character, comprising: a plurality of storage devices each including electrically operated releasing means for dispensing selected articles from said storage devices; switching means for selectively actuating any said releasing means; an article delivery position and an article return position; common delivery conveying means positioned between said article delivery position and said article return position to receive articles released by said releasing means and including driving means therefor; means operable by tokens representing the value of said released articles and connections therefrom to said driving means to move said conveying means in one direction for the delivery of said articles to said article delivery position; and electrical contact means and connections therefrom to said driving means operable to move said conveying means in another direction for the delivery of said articles to said article return position.

13. A system for vending articles of varied character, comprising: a plurality of storage devices, each including electrically operated releasing means for dispensing selected articles from said storage devices; switching means for selectively actuating any said releasing means; adding means to add up progressively the values of selected articles; registering means to register the amount in tender received and connections therefrom to said adding means; checking means and connections therefrom to said adding means and operable over said connections between said adding means and said registering means to check the coincidence of said tender received with the added up values of said selected articles; power operated conveyor means including driving means and connections therefrom to said checking means and operable thereby to move said conveyor means in one direction for the delivery of released articles to one discharge point; and contact means and connections therefrom to said driving means to move said conveyor means in the opposite direction to transfer released articles to another discharge point.

14. A system for vending articles of varied character, comprising: a plurality of storage devices each including electrically operated releasing means for dispensing selected articles from said storage devices; switching means for selectively actuating any said releasing means; adding means to add up progressively the values of a batch of selected articles; a coin receiving device including a coin tray to collect the coins, coin operated contact means operable by coins of various monetary units, and counting means to count the values of coins received by said coin receiving device; relay means and connections therefrom to said adding means and to said counting means to detect the coincidence in values added up by said adding means and counted by said counting means; power operated conveyor means carrying released articles and including driving means and connections therefrom to said relay means to move said conveyor means in one direction; contact means and connections therefrom to said driving means, said adding means and said counting means to move said conveyor means in the opposite direction and to restore said adding means and said counting means to their initial position; and means operable by said contact means to shift said coin tray for the refund of coins collected therein.

THOMAS S. SKILLMAN.

References Cited in the file of this patent

UNITED STATES PATENTS

| Number | Name | Date |
|---|---|---|
| 1,867,496 | Cable | July 12, 1932 |
| 2,082,561 | Appelius | June 1, 1937 |
| 2,083,947 | Furber | June 15, 1937 |
| 2,276,293 | Farmer | Mar. 17, 1942 |
| 2,276,294 | Farmer | Mar. 17, 1942 |
| 2,353,002 | Armbruster | July 4, 1944 |
| 2,354,896 | Weiler | Aug. 1, 1944 |

FOREIGN PATENTS

| Number | Country | Date |
|---|---|---|
| 511,285 | Great Britain | Aug. 10, 1939 |